United States Patent
Lehtinen et al.

(10) Patent No.: US 7,096,021 B1
(45) Date of Patent: Aug. 22, 2006

(54) METHOD FOR INITIATING IN A TERMINAL OF A CELLULAR NETWORK THE MEASUREMENT OF POWER LEVELS OF SIGNALS AND A TERMINAL

(75) Inventors: Otto Lehtinen, Stony Brook, NY (US); Antti Toskala, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/979,208

(22) PCT Filed: May 25, 2000

(86) PCT No.: PCT/FI00/00470

§ 371 (c)(1),
(2), (4) Date: Feb. 12, 2002

(87) PCT Pub. No.: WO00/74421

PCT Pub. Date: Dec. 7, 2000

(30) Foreign Application Priority Data

May 26, 1999 (FI) ...................................... 991194

(51) Int. Cl.
*H04Q 7/20* (2006.01)
(52) U.S. Cl. ...................... 455/442; 455/436; 455/522
(58) Field of Classification Search ................ 455/522, 455/432.1, 437, 436, 440, 442, 439, 69, 13.4, 455/448, 445, 513, 517, 67.11, 524, 525; 370/335
See application file for complete search history.

(56) References Cited

U.S. PATENT DOCUMENTS

| | | | | |
|---|---|---|---|---|
| 5,109,390 A | * | 4/1992 | Gilhousen et al. | 370/335 |
| 5,267,261 A | | 11/1993 | Blakeney, II et al. | 375/1 |
| 5,828,963 A | * | 10/1998 | Grandhi et al. | 455/450 |
| 5,844,898 A | | 12/1998 | Tanoue | |
| 5,896,368 A | * | 4/1999 | Dahlman et al. | 370/335 |
| 5,926,470 A | * | 7/1999 | Tiedemann, Jr. | 370/334 |
| 6,594,489 B1 | * | 7/2003 | Holcman | 455/432.1 |

FOREIGN PATENT DOCUMENTS

JP          8 317446         8/1996

(Continued)

OTHER PUBLICATIONS

Office Action dated Apr. 23, 2004 in corresponding Japanese Patent Application No. 2001-500591.

*Primary Examiner*—Matthew D. Anderson
*Assistant Examiner*—Tan Trinh
(74) *Attorney, Agent, or Firm*—Cohen, Pontani, Lieberman & Pavane

(57) ABSTRACT

The method according to the invention is intended to be applied in a situation where the power level of the signals transmitted by that mobile network to which the terminal is connected sink below predetermined threshold levels. Then the terminal is arranged to measure the power levels of signals transmitted by the base stations of at least one second system. The method according to the invention comprises advantageously steps in which the cellular radio system at first transmits to the terminal at least one threshold value. Then the terminal measures the strength of the signal transmitted by at least one base station and compares the measured signal strength with said threshold value. If the signal strength of the received signal is lower than said threshold value the transmission mode is changed to a mode where the measurement of the signals of a second system can be performed. A terminal according to the invention comprises advantageously means with which the steps of the method presented above can be performed.

14 Claims, 3 Drawing Sheets

FOREIGN PATENT DOCUMENTS

| | | | |
|---|---|---|---|
| WO | WO 94/29981 | | 12/1994 |
| WO | WO 96/12380 | * | 4/1996 |
| WO | WO 96/23369 | | 8/1996 |
| WO | WO 97/31503 | * | 8/1997 |
| WO | WO 97/40592 | | 10/1997 |
| WO | WO 97/40593 | | 10/1997 |
| WO | WO 98/27777 | | 6/1998 |
| WO | WO 98/36607 | | 8/1998 |
| WO | WO 98/50909 | | 11/1998 |
| WO | WO 99/27747 | | 6/1999 |

* cited by examiner

METHOD FOR INITIATING IN A TERMINAL OF A CELLULAR NETWORK THE MEASUREMENT OF POWER LEVELS OF SIGNALS AND A TERMINAL

PRIORITY CLAIM

This is a national stage of PCT application No. PCT/FI00/00470, filed on May 25, 2000. Priority is claimed on that application and on application No. 991194, filed in Finland on May 26, 1999.

FIELD OF THE INVENTION

This invention relates to a method for realising measurements at handover between two systems. The invention relates particularly to a method for realising the handover between systems, of which at least one is a WCDMA system.

BACKGROUND OF THE INVENTION

Mobile communication systems are in constant development. Even at the present there are several different mobile communication systems in use, which operate overlapping each other in the same area. At present one of the most frequently used networks is the GSM (Global System for Mobile telecommunications) network, which still will be used a long time, due to its high degree of utilisation and prevalence. New network topologies will rise in parallel with this network, and typically the utilization of these new topologies require new terminals. In future it must be possible to use the terminals in a number of networks. Then a change over from the use of a first network to the use of a second network must be effected without problems.

Particularly at present there is a general opinion that at least some of the future mobile communication networks will be based on the so called wideband CDMA technique (WCDMA; Wideband Code Division Multiple Access). The WCDMA technique is at present applied for instance in the UMTS system (Universal Mobile Telecommunication System). Thus it is important that the terminals in for instance the WCDMA system can change over to use for instance a GSM connection when required. The change over from using one network to another is usually called a inter system handover.

A terminal may be forced to change over from one network to another for instance when the terminal gets outside the coverage area of that first network to which it is connected. Then, if the coverage area of a second network is sufficient at the terminal's new geographical location, it is advantageous to change over to use said second network system. In such a case the change over from using one network to using a second network can advantageously be made with the same actions as in a handover between base stations in the same network.

The answer to the question when one shall change over to use the second network is not unambiguous. According to a first idea a terminal blindly changes over to use the second network arrangement when the reception from that network, to which the terminal originally was linked, is disconnected. According to another idea it is possible to make measurements between the networks, in the same way as in present network solutions which use the TDMA system (Time Division Multiple Access). According to this arrangement the connection quality is measured, and if it is inadequate, then terminal changes over to use the second network.

The problem in the above presented first solution is that if the terminal blindly decides to change over to use the second network, then it is not completely sure that the reception from the second network is at all better than that of the currently used network. If the reception from the new network is weaker, or if there is no reception at all, the terminal loses for a moment the connection to both possible networks. Thus a blind change of network can be considered as a very unreliable alternative. The arrangement of the second prior art solution is in other respects acceptable, but it is not suited to be used in all network systems, such as in the WCDMA system (Wideband Code Division Multiple Access). This is due to the fact that a measurement made in the TDMA system at handover will interfere with the operation of the WCDMA system and reduce the capacity of said system.

It should be particularly noted that the above presented solutions are intended to be applied in a situation where the first and second networks have similar systems, i.e. that both are for instance GSM networks. They may be for instance maintained by different operators having a mutual contract about roaming between each other's networks. Thus it is not possible to directly apply said solutions in a case where the concerned networks differ from each other regarding the technique.

Patent application WO9731503 discloses a cellular telephone system offering both CDMA and GSM services. In this system specific CDMA pilot beacons, which generate identifiable CDMA pilot signals, are located near or at GSM base stations. The edge of the CDMA service region is thus indicated by these pilot beacons. A subscriber unit detects the CDMA pilot signals and informs a base station controller of the CDMA system about them. The base station controller identifies the CDMA pilot signals as signals relating to the CDMA pilot beacons and initiates a CDMA to GSM handover.

SUMMARY OF THE INVENTION

The object of this invention is to remove the above presented prior art problems and to present an advantageous solution to how the decision making relating to the regarding handover can be based on measurements, so that the capacity used for the decision making relating to the handover is minimised at the same time.

The objects of the invention are attained by arranging the terminal to measure the transmission power of the second network. Preferably the terminal is arranged to measure the transmission power of the second system only when said action is required.

The method according to this invention for initiating in a terminal using a first cellular radio system the measurement of the power levels of signals transmitted by at least a second cellular radio system is characterised in that, when the power level of the signal of the base station of the first cellular radio system received by the terminal remains below a predetermined threshold value there is initiated a measurement of the power levels of signals transmitted by at least one base station of said second cellular radio system.

A terminal according to this invention is a terminal of a cellular radio system and capable to initiate, while using a first cellular radio system, the measurement of the power levels of signals transmitted by at least a second cellular radio system, and it is characterised in that it comprises means for receiving at least one threshold value transmitted to the terminal by a first cellular radio system, means for measuring the strength of the signal transmitted by at least one base station of the first cellular radio system, means for comparing the measured signal strength with said threshold value, means for requesting a free measurement period from the first cellular radio system, which means are arranged to request a free measurement period when said measured signal strength is lower than said threshold value, means for measuring the strength of the signal of at least one base station of said second cellular radio system during at least one free measurement period.

Advantageous embodiments of the invention are presented in the dependent claims.

According to the invention some network element transmits to the terminal a list of threshold values for the signal strength. By comparing the signal powers received by the terminal with said threshold values the terminal decides whether it shall initiate a measurement of the signal strengths of a second cellular radio system. During the measurement the manner of transmission it at least one of the uplink and downlink connections is changed so that the measurement can be performed at the same time, even if the connection to the second system is operational. The solution according to the invention is particularly well applicable in a situation where the first system in use is a WCDMA system, and where during its use decisions are made to change over to use a GSM system.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

The invention is described in more detail below with reference to the enclosed figures, in which.

The same reference numerals and markings are used for corresponding parts in the figures.

DETAILED DESCRIPTION OF THE PRESENTLY PREFERRED EMBODIMENTS

When a terminal moves within a certain geographical area the quality of the network connection can vary considerably. The quality of the connection can begin to decrease, particularly when approaching for instance the border areas of a certain mobile communication network. Then, according to the invention, the measurement of signals of a second network is also initiated, on the basis of which a change of networks can be realised, when required. In cellular radio systems where the base stations transmit to the terminals different information about the neighbouring cells, such as the frequencies in use and so on, it is according to the invention possible to add to this information such information about the signal minimum powers, or threshold levels, which the terminals should get from each cell. On the basis of this information a terminal can be arranged to initiate the measurement of the transmission powers also of a second mobile communication network, when required.

Figure 1:
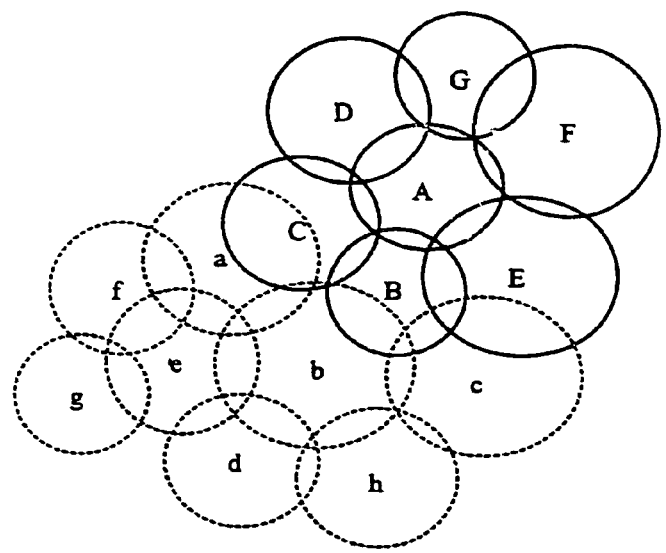
FIG. 1 shows the interface between two network systems.

Let us examine the arrangement of FIG. 1 as an example. The figure shows with a continuous line and capital letters A–G the cells of a first system and with broken lines and small letters a–h the cells of a second system. Let's examine a situation where a terminal at the moment in question has a connection to said first network. Let the terminal first be in cell A. Via the network the terminal continuously receives information about the cells which are neighbour cells to that cell where the terminal is currently located. This information is characteristic to each cell, such as the frequencies in use and the like. According to the information the terminal also receives the threshold values of the transmission powers of each neighbouring cell, whereby the signal power level received from each base station should exceed these threshold values. In this exemplary situation the terminal moves from cell A to cell B, and the terminal moves in the direction toward the outer border of the continuous coverage area of the network in question, i.e. toward the outer border of cell B. In this exemplary situation the signal power received from some neighbouring cell will fall under a predetermined threshold value when the terminal is located in a particular point of cell B, whereby the threshold value thus has been made known to the terminal by the base station of the that cell where the terminal currently is located, for instance with the aid of the above presented list of threshold values. Then the terminal can be arranged to initiate measurements of the transmission powers of the second mobile communication system, and according to these measurements the terminal can change over to use the services of the second network, when required. The cells of the second network are shown in FIG. 1 with broken lines and small letters. Said first network can be for instance a WCDMA network and said second network can be for instance a GSM network.

Figure 2:
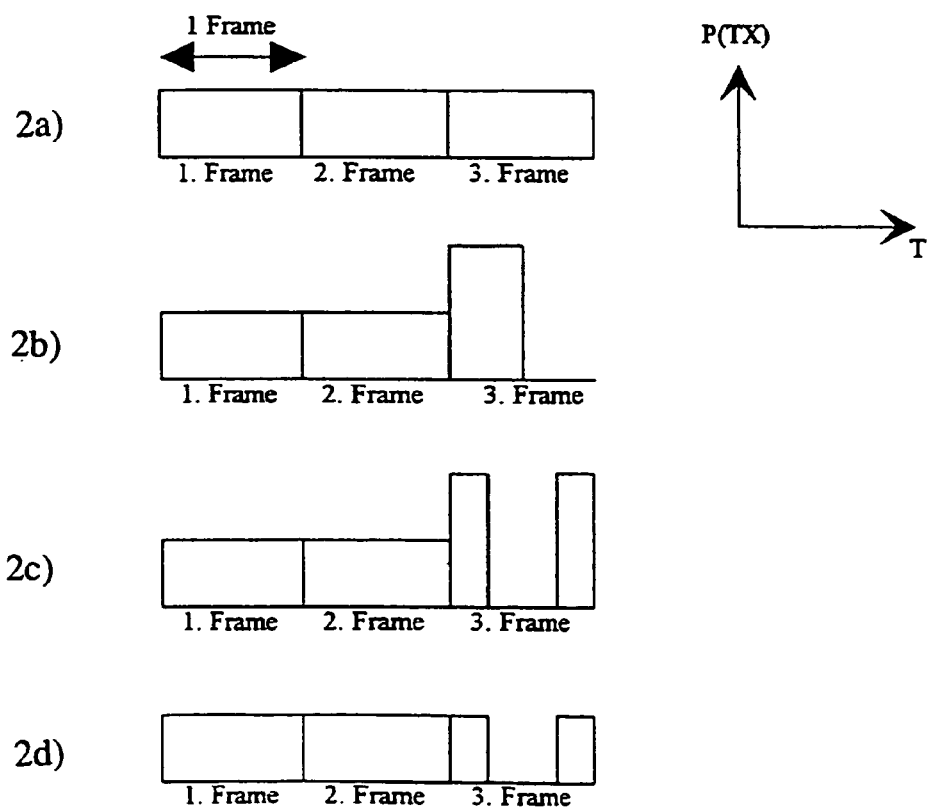
FIGS. 2a–2d show different transmission states in a WCDMA system.

Next there is shown a typical feature of the WCDMA system, the compressed transmission mode (slotted mode) which can be utilised in the handover between networks. This means that in the WCDMA system it is possible to control the transmission mode of the data contained in the frames which are used for transmission. The time used for the transmission of data in one frame can be controlled with the aid of the transmission power. Generally it can be said that, the shorter the time desired for the transmission of the data, the higher is the required transmission power. The FIGS. 2 a–d show some possible transmission arrangements in the WCDMA system. FIG. 2a shows data transmission in a so called normal situation where the transmission of each frame is performed with the same transmission power and in equally long time slots. The transmission power is proportional to the size of the rectangle representing the frame in the vertical direction and the transmission time is proportional to the size of the rectangle representing the frame in the horizontal direction. FIG. 2b shows a situation where the whole last frame is transmitted in the first half of the frame by using a higher transmission power. To a person skilled in the art it is obvious that it is possible to transmit the frame also in the later half of the frame. FIG. 2c shows an arrangement where the data of the last frame is transmitted in two different parts during the same frame. A part of the data is transmitted during the first half of the frame and the rest of the data of said frame is transmitted during the second half of the frame, so that between the data transmissions there is left a period where no data is transmitted. Correspondingly, in FIG. 2d the transmitted data is compressed so that it is not necessary to change the used transmission power, even though the time used for the data transmission is shorter than in a normal situation. The situations shown in the figures, where data is transmitted by any new arrangement, are called compressed transmission modes (slotted mode). To a person skilled in the art it is obvious that it is possible to arrange a number of said compressed transmission modes by changing the compression method, such as the transmission power.

Figure 3:
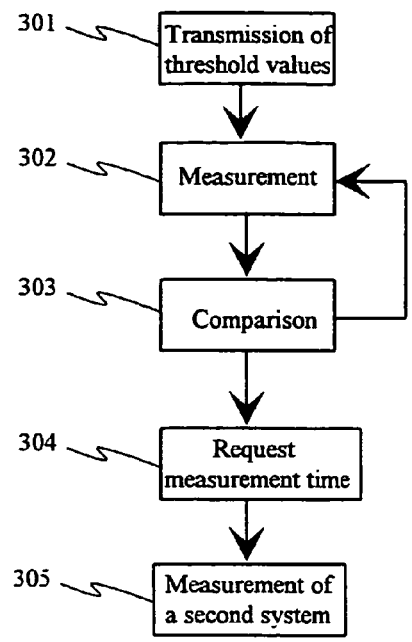
FIG. 3 shows a method according to the invention in the form of a flow diagram.

Let us next examine the operation of an arrangement according to the invention in the form of a flow diagram. The flow diagram is shown in FIG. 3. In the first step the cellular radio system transmits to the terminal at least one threshold value, 301, for instance in connection with the list of the base stations. When the terminal has received the list it measures the strength of the signal transmitted by at least one base station of the cellular radio system, 302. In the next step the terminal is arranged to compare at least one threshold value with the measured signal, 303. When the comparison shows that the strength of the measured signal is higher than the threshold value it is possible according to one preferred embodiment to switch into making a new signal strength measurement after a predetermined time. If the strength of the measured signal is lower than the predetermined threshold value, then the terminal is arranged to request a free measurement time of the cellular radio system, 304, for the measurement of a second system. When the cellular radio system has granted the measurement time, for instance with the aid of a rearrangement of the transmission state, then the terminal begins to measure the strength of the signal transmitted by at least one base station in the second system, 305. Advantageously the measurement is performed during at least one free period arranged in the transmitted frames. To a person skilled in the art it is obvious that also the transmission of said threshold values to the terminal can be advantageously performed again after a predetermined time.

Figure 4:
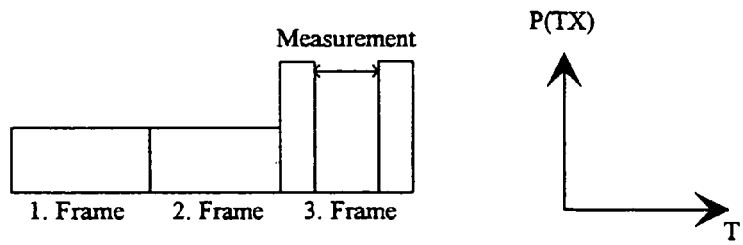
FIG. 4 shows the transmission state of a WCDMA system.

Let us examine the arrangement according to the invention described above, for instance in a situation where said first network is a WCDMA network and said second network is a GSM 900 network, and which arrangement utilises the above described feature of the WCDMA system. In this exemplary description of the invention reference is made to the above presented FIG. 1. The cells shown by continuous lines and capital letters are cells of the WCDMA system, and correspondingly the cells shown by broken lines and small letters are cells of the GSM 900 system. The terminal has an active connection to the base station of the cell A of the WCDMA system. The terminal moves to the cell B. From the base station of the current cell the terminal obtains regular information about the parameters of the neighbouring cells. In the same connection there is transmitted information about the threshold values of the transmission powers at which the terminal at least shall receive the signals from the base stations of the neighbouring cells. Preferably, if for instance the power level of a signal received from one neighbouring base station is lower than the threshold value set for said base station, then the terminal can shift to measure the transmission powers of the second system. This situation may occur for instance in a case where the terminal has moved to the periphery of the cell marked B in the example of FIG. 1, where the transmission power of a neighbouring cell of the same system remains below the threshold value. When the terminal during a connection shifts to measure the transmission powers of another system, the type of the connection must be changed either in the uplink or downlink connection. In the case of an advantageous embodiment this is made on the downlink connection, so that the terminal has time to receive also signals of the second network. Advantageously the measurement is made according to the FIG. 4 always when no data is transmitted in a frame. It is obvious that the data transmitted in the compressed transmission mode can be arranged in a frame also in other ways than that shown in FIG. 4. To a person skilled in the art it is obvious that, that moment when a terminal begins to measure the transmission powers of the second system, can be arranged also in some other way than that presented above. According to one arrangement the terminal begins to measure the transmission powers of the second system only then, when the transmission powers of two base stations remain below the predetermined threshold values. Said base stations can be examined in the same way also concerning more than two base stations regarding the need for measurements.

Figure 5:
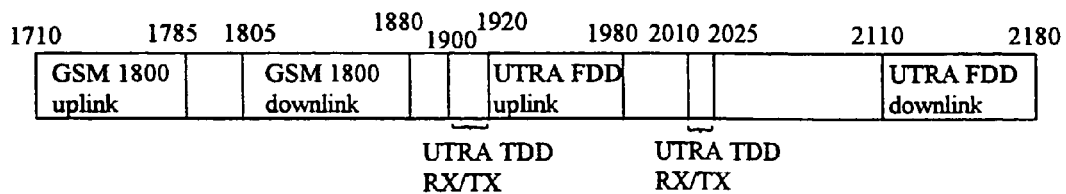
FIG. 5 shows the frequency bands used by different systems.

Let us then examine how the method according to the invention is applied in mobile communication systems, of which the first system is a WCDMA system and the second one a GSM 1800 system. FIG. 5 shows the frequency bands used by said system, both on the uplink and on the downlink. In this case the method according to the invention is applied in a way corresponding to that presented above. The terminal shifts to measure the signals of the GSM 1800 network when a certain predetermined number of the signals transmitted by the base stations of the WCDMA system remain below the threshold values which in advance have been transmitted to the terminal. However, when one examines the FIG. 5, it is seen that the uplink frequencies 1920–1980 MHz (UTRA FDD uplink; UMTS Terrestrial Radio Access Frequency Division Duplex) of the WCDMA system are quite close to the downlink frequencies 1805–1880 MHz of the GSM 1800 system. Because the transmitter section and the receiver section in the terminal are not able to distinguish sufficiently well such frequencies which are so close to each other, said compressed transmission mode is used in this exemplary embodiment both on the uplink and the downlink connections. With the aid of this arrangement it is possible to make sure that the measurements of the second system will not interfere with the other system's connection, and vice versa.

To a person skilled in the art it is obvious that corresponding measurement problems, which relate to the above presented GSM 1800 system, also relate to the measurement of the UTRA TDD system (UMTS Terrestrial Radio Access Time Division Duplex). The odd frequency bands 1900–1920 MHz and 2010–2025 MHz used by the UTRA TDD system are located close to the uplink frequencies of the WCDMA system. Then the transmission on the uplink must be discontinued in order to measure the UTRA TDD system. The frequencies used by the UTRA TDD system are marked in the FIG. 5.

According to a preferred embodiment of the invention, when the terminal measures the transmission power of a second system with the aid of the compressed transmission mode, the terminal can be arranged to respond to the first system, to which it is connected. The terminal may communicate to the first system, for example, information relating to the measurements of the second system. The first system can then make decisions about the measurements based on the communicated information. If a terminal is currently measuring the transmission power of a base station of a certain cell of the second system, the terminal can, for example, be arranged to measure also the cells around the cell in question. Furthermore, a terminal that is measuring many cells of the second system may communicate to the first system, for example, its direction or an estimate of its location in connection with the measurement reports.

The first system can also make decisions about the measurements relating to the second system, for example, based on the location of the terminal. The location of a terminal can be determined, for example, from the measurement results relating to the second system. Alternatively, it may be possible for the first system to determine the location of the terminal without information relating to the second system. The location of the terminal can affect, for example, how often measurements relating to the second system are made. If the terminal moves away from the coverage area of the first system, the first system can control the terminal so that the measurements are made more often. This way the terminal can accurately monitor the transmission power of the second system, and it can make a handover to the second system as soon as the second system can provide a connection having a better quality than the quality of the current connection. Correspondingly, when the terminal moves toward an area, where the reception from the first system is better, a handover to the second system is usually less probable. Therefore, it is possible in this case to make the measurements relating to the second system less frequently and perhaps terminate the measurements when, for example, the measured transmission powers of the nearest base stations of the first system are higher than the predetermined threshold values. To a person skilled in the art it is obvious that the time required to perform the measurements relating to the second system can be obtained by changing even more frames to use the compressed transmission mode.

To a person skilled in the art it is obvious that the arrangement according to the invention can be applied also in a situation where the same area has more than two networks. For instance, in a case with three networks the terminal is connected to a first system. When the power levels of the first network sink below the predetermined threshold levels the terminal begins to measure the power levels of the second system. Advantageously, it can be arranged so that the threshold levels also of the second system are transmitted to the terminal, and by comparing the received signal power levels with the threshold levels the terminal can shift to measure the power levels of a third system. The measurements are advantageously made in the compressed transmission mode. To a person skilled in the art it is obvious that the terminal can also be arranged to measure the power levels of more systems than presented above.

Figure 6:
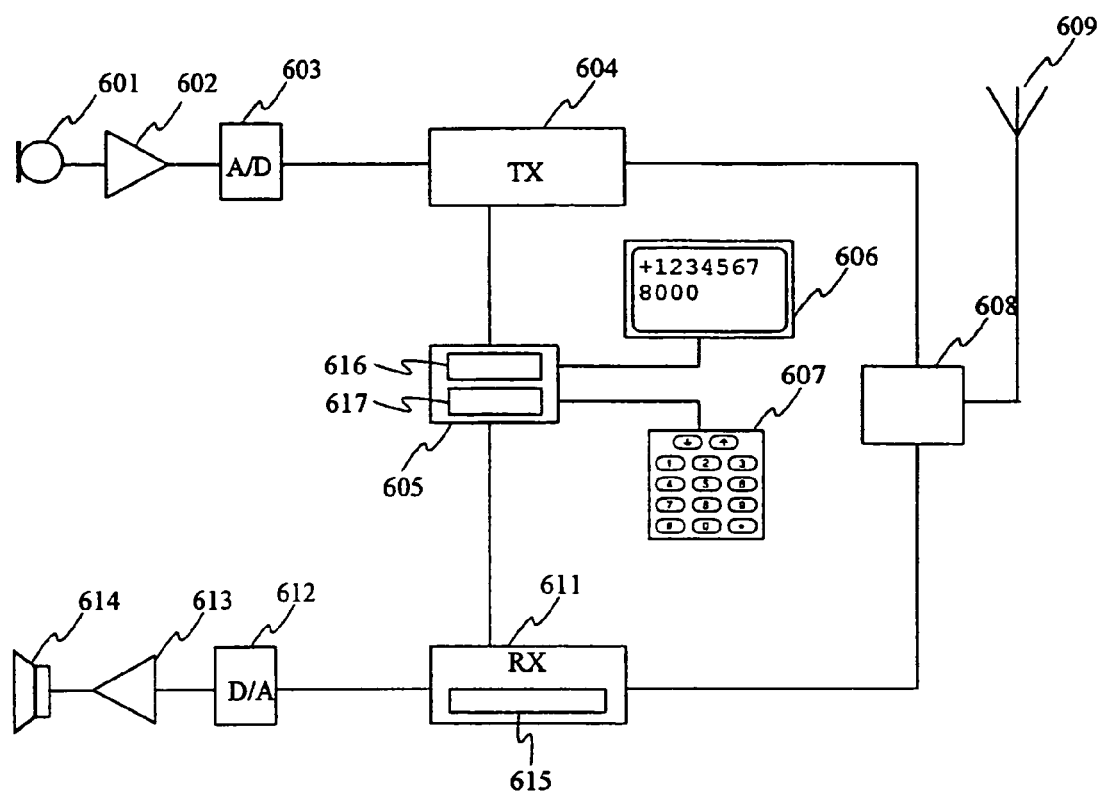
FIG. 6 shows an arrangement according to the invention in a terminal.

To a person skilled in the art it is obvious that a terminal according to the invention can be for instance a mobile station. FIG. 6 presents the block diagram of a terminal according to the invention, the terminal being a mobile station. The mobile station comprises parts which are typical of the device, such as a microphone 601, a keyboard 607, a display 606, an earpiece 614, a transmission/reception switch 608, an antenna 609 and a control unit 605. The figure further shows the transmission and reception blocks 604, 611 which are typical of a mobile station. The transmission block 604 comprises functions required for speech encoding, channel encoding, encryption and modulation as well as the RF functions. The receiver block 611 comprises the corresponding RF functions as well as the functions required for demodulation, decryption, channel decoding and speech decoding. A signal coming from the microphone 601, amplified in the amplifier stage 602 and converted into digital form in the A/D converter, is directed to the transmitter block 604, typically to a speech encoding means in the transmitter block. The transmission signal, which is processed, modulated and amplified in the transmitter block, is supplied via the transmission/reception switch 608 to the antenna 609. The received signal is directed from the antenna via the transmission/reception switch 608 to the receiver block 611, which demodulates the received signal and performs the decryption and channel decoding. The speech signal obtained as a result is supplied via the D/A converter 612 to the amplifier 613 and further to the earpiece 614. The control unit 605 controls the operation of the mobile station, reads the control commands given by the user via the keyboard 607, and presents messages to the user via the display 606. For instance, the receiver block 611 of the mobile station comprises advantageously means 615 with which the mobile station can receive signals transmitted by the cells around the current cell, and process them for instance so that the power levels of the signals can be determined. The receiver block 611 of the mobile station can advantageously receive with the same means 615 the threshold value of the transmission power of at least one base station transmitted by the cellular radio system. Further e.g. the control block 605 of the mobile station comprises means 616 with the aid of which it can compare the threshold values with the received signal power levels. Further for example the control block 605 of the mobile station comprises advantageously means 617, with the aid of which it can request, depending on the result of the comparison, a permission from the cellular radio system to shift into the compressed transmission mode, in which the mobile station can measure also the transmission powers of a second system. The receiver block 611 of the mobile station comprises advantageously means, with the aid of which the signals transmitted by a second system can be measured. These means can be the same as those with which the signals of the first system are received, but they can also be arranged to measure only the signals of said second system. According to a preferred embodiment the above presented means 615; 616; 617 can be realised for instance with the aid of a microprocessor and software. To a person skilled in the art it is obvious that the above presented arrangements can be realised also in other corresponding terminals, in a corresponding way as in a mobile station.

With the aid of the arrangement according to the invention one avoids extra measurements between the networks. If the terminal is located for instance in the cell A of FIG. 1, then it is obvious that the reception of the respective network is good, whereby no measurements are necessary. When the terminal moves into border regions of said network, where the reception becomes weaker, only then measurements of a second network are initiated. Further, with the aid of an arrangement according to the invention it is possible to arrange the frequency of the measurements to depend for instance on the motion direction of the terminal, with which arrangement it is possible to save the network's resources when required.

The solution according to the invention is also advantageous from the operator's point of view. Network resources are saved because the terminal, such as a mobile station, takes care of the measurements. Particularly advantageously the network operator is able to arrange the settings of the network so that they allow the measurements only in a certain area, when required. The operator can define such areas for instance with the aid of preliminary measurements. With an arrangement like this the operator is able to ensure that no unnecessary measurements are made. Then the network capacity can be allocated for other required functions.

To a person skilled in the art it is obvious that the above presented arrangement according to the invention can be applied also in other network solutions than those presented above. The invention can be generally applied within the inventive idea defined by the enclosed claims.

Thus, while there have been shown and described and pointed out fundamental novel features of the present invention as applied to a preferred embodiment thereof, it will be understood that various omissions and substitutions and changes in the form and details of the devices described and illustrated, and in their operation, and of the methods described may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method for initiating in a terminal using a first cellular radio system measurement of power levels of signals transmitted by at least one second cellular radio system for a decision to change over to said second cellular radio system, comprising the steps of:
   receiving a signal from a base station of the first cellular radio system at the terminal, the signal having a power level; and
   granting to the terminal at least one free period of time for initiating measurements of the power levels of signals transmitted by at least one base station of said at least one second cellular radio system only after the power level of the signal of the base station of the first cellular radio system received by the terminal remains below a predetermined threshold value,
   wherein the terminal maintains radio connection with the first cellular radio system while measuring the second cellular radio system.

2. The method of claim 1, wherein base-station specific threshold values are defined.

3. The method of claim 2, wherein base-station specific threshold values are transmitted to the terminal in connection with a list of base stations.

4. The method of claim 1, wherein the terminal provides response information relating to measurements of the transmission powers of the base stations of said at least one second cellular radio system to the first cellular radio system.

5. The method of claim 4, wherein the terminal transmits to the first cellular radio system an estimate of a location of the terminal in the first cellular radio network as response information relating to the measurements of the transmission powers of the base stations of said at least one second cellular radio system.

6. The method of claim 1, wherein the measurements are performed using a compressed transmission mode.

7. The method of claim 1, further comprising the steps of:
   transmitting at least one threshold value to the terminal from the first cellular radio system,
   measuring the power level of the signal transmitted by at least one base station of the first cellular radio system using the terminal,
   comparing the measured power level with said threshold value using the terminal,
   transmitting to the first cellular radio system a request for a free period of time in which to perform measurements if said measured power level is lower than said threshold value, and
   measuring the power level of the signal of at least one base station of said second cellular radio system during at least one free period of time in which to perform the measurements,
   wherein the first cellular radio system uses a compressed transmission mode during a time that at least one frame is transmitted to the terminal in response to said request.

8. The method of claim 1, wherein said first cellular radio system is a WCDMA system.

9. The method of claim 1, wherein said at least one second cellular radio system is a GSM 900 system.

10. The method of claim 1, wherein said at least one second cellular radio system is a GSM 1800 system.

11. The method of claim 1, wherein said at least one second cellular radio system is an UTRA TDD system.

12. A terminal of a cellular radio system configures to initiate, while using a first cellular radio system, measurement of the power levels of signals transmitted by at least one second cellular radio system for a decision to change over to said second cellular radio system, comprising:
   means for receiving at least one threshold value transmitted to the terminal by the first cellular radio system,
   means for measuring a power level of a signal transmitted by at least one base station of the first cellular radio system,
   means for comparing the measured power level with said at least one threshold value,
   means for transmitting to the first cellular radio system a request for a free time period in which to perform the measurement, said means being arranged to transmit the request for the free time period in which to perform the measurement only after said measured power level remains below said at least one threshold value, and
   means for initiating the measurement of the power level of the signal of at least one base station of said at least one second cellular radio system during at least one said free time period in which to perform the measurement,
   wherein the terminal maintains radio connection with the first cellular radio system while measuring the second cellular radio system.

13. The terminal of claim 12, wherein the terminal is configured to perform the measurement in a compressed transmission mode.

14. The terminal of claim 12, wherein the terminal is a mobile station.

* * * * *